W. L. PATTERSON.
PROJECTION APPARATUS.
APPLICATION FILED AUG. 5, 1905.
957,899.
Patented May 17, 1910.
3 SHEETS—SHEET 2.
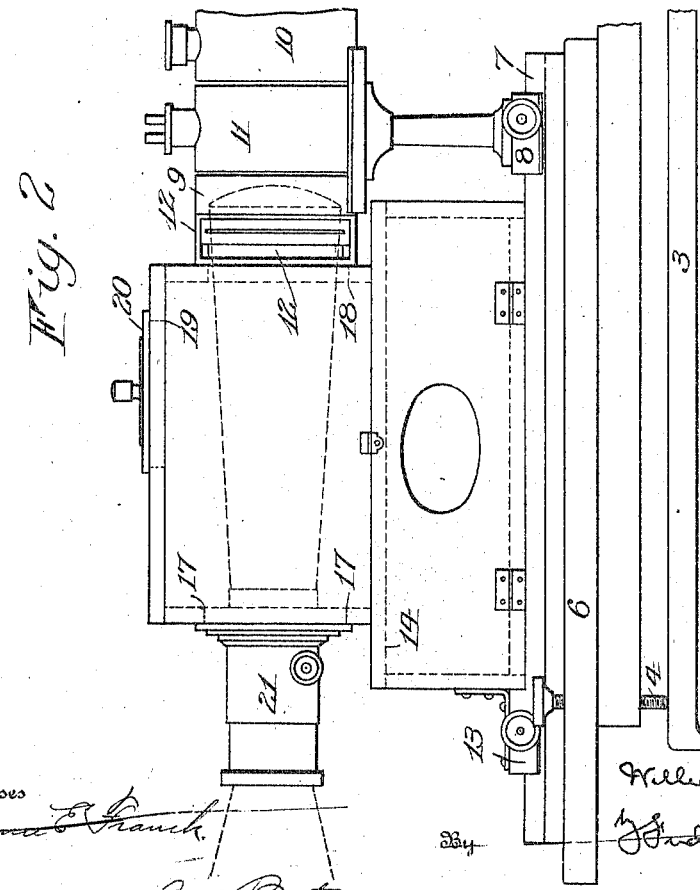

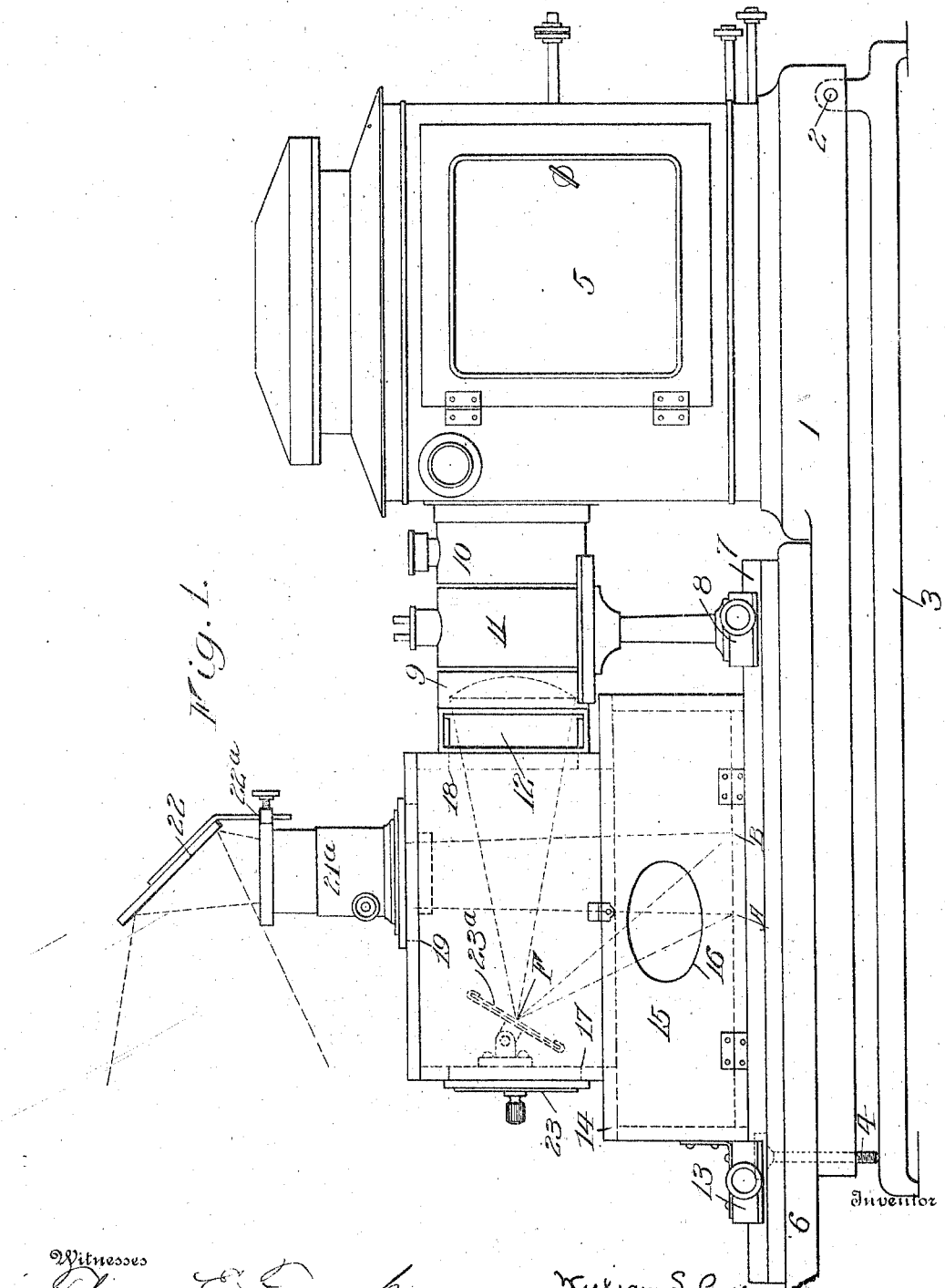

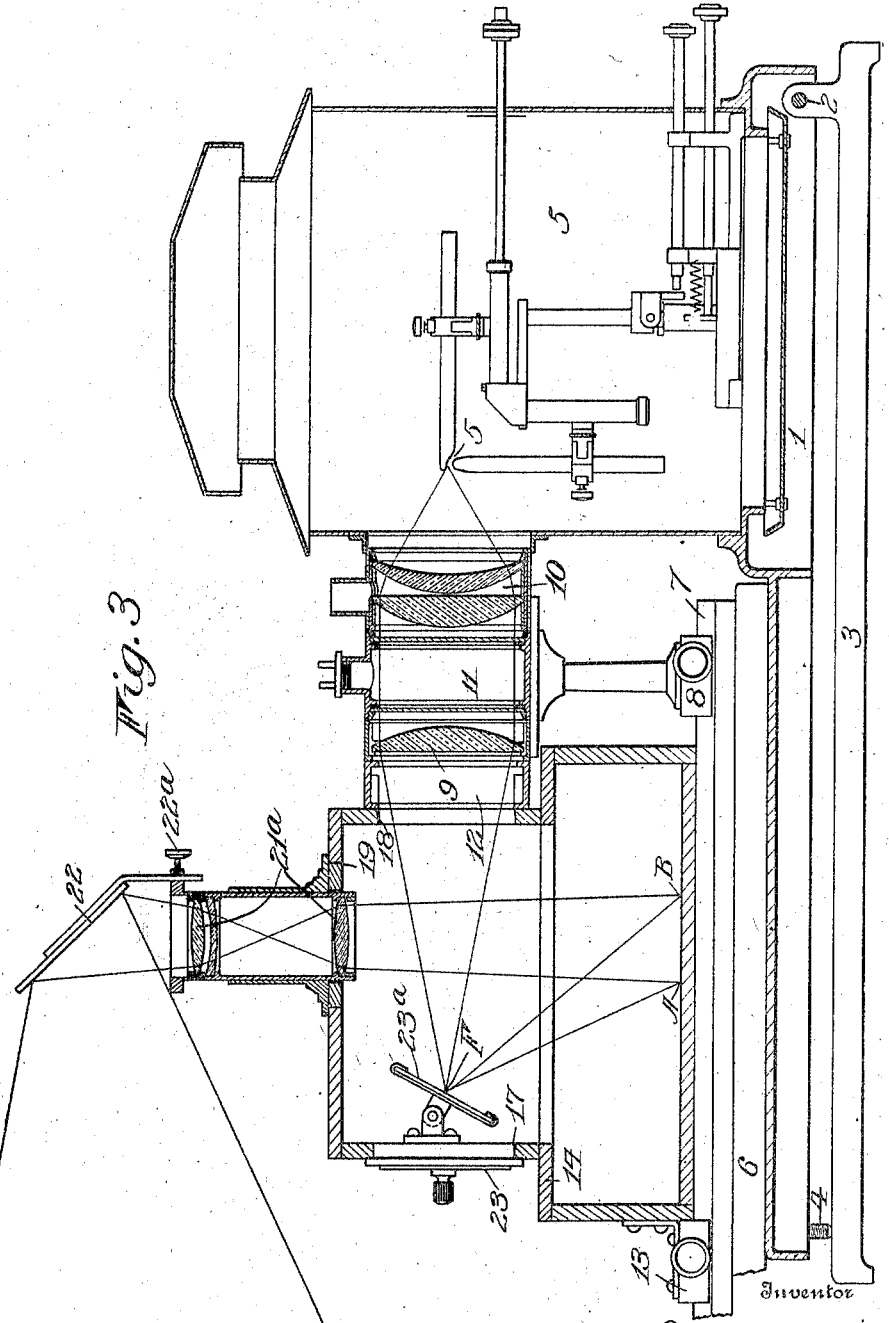

UNITED STATES PATENT OFFICE.

WILLIAM L. PATTERSON, OF ROCHESTER, NEW YORK, ASSIGNOR TO BAUSCH & LOMB OPTICAL COMPANY, OF ROCHESTER, NEW YORK, A CORPORATION OF NEW YORK.

PROJECTION APPARATUS.

957,899.      Specification of Letters Patent.      Patented May 17, 1910.

Application filed August 5, 1905. Serial No. 272,886.

*To all whom it may concern:*

Be it known that I, WILLIAM L. PATTERSON, of Rochester, in the county of Monroe and State of New York, have invented certain new and useful Improvements in Projection Apparatus; and I do hereby declare the following to be a full, clear, and exact description of the same, reference being had to the accompanying drawings, forming a part of this specification, and to the reference characters marked thereon.

My present invention relates to improvements in devices for projecting magnified images upon a screen, and the purpose of the invention is to provide improved projecting apparatus of this kind capable of highly illuminating both transparent and opaque objects and projecting a clearly defined image thereof upon a suitable screen, the construction and arrangement of the parts enabling the objects to be handled and positioned with the greatest facility to enable the best optical results to be obtained.

To these and other ends the invention consists in certain improvements and combinations and arrangements of parts to be hereinafter more fully described, the novel features being pointed out particularly in the claims hereunto annexed.

In the drawing: Figure 1 is a side elevation of an apparatus constructed in accordance with my invention, the parts being arranged for projecting opaque objects. Fig. 2 illustrates a projection apparatus arranged to receive transparent objects such as the ordinary lantern slides, the lamp being omitted; and Fig. 3 is a central vertical sectional view of the apparatus shown in Fig. 1.

The same characters of reference in the several views designate similar parts.

In the present embodiment of my invention the entire projecting apparatus is mounted upon a rigid, preferably metallic bed 1 pivoted at the rear as at 2 to a suitable base 3, leveling screws 4 being provided between the base and the forward portion of the bed to permit adjustment of the bed and the projecting apparatus thereon, in a vertical plane. At the rear of the bed is mounted a lamp or other suitable illuminating device 5, and in front of the lamp is provided an optical bench 6, the latter having a bearing or way 7 thereon extending longitudinally of the bed. Operating on this bearing is a slide 8 having a standard thereon for supporting a system of condensing lenses which may be of any suitable type, that shown embodying the forward lens element 9, the rear lens element 10 and the removable liquid cooling-tank 11 between them, a receptacle 12 being provided in front of the condensing system to receive the ordinary transparent slides.

Operating longitudinally of the way 7 is a slide 13 attached to a chamber 14, the lower portion of this chamber being enlarged or of suitable dimensions to receive books and other articles in such a way that the portion to be projected will occupy the area A, B, a door 15 being provided at one side of this chamber to admit the articles and a handhole 16 being formed in the door preferably to enable the articles to be manipulated conveniently while illuminated. The upper portion of the chamber is in line with the condensing system, and is closed except for the openings 17 and 18 at the front and rear respectively and in alinement with the optical center of the condensing system, and an opening 19 in the top thereof.

In operating the apparatus for projecting images from transparent objects on the screen, a removable cover 20 is fitted into the top opening 19 to prevent leakage of light, while a suitable projecting lens 21 is fitted in the opening 17 in line with the optical center of the condensing system, (see Fig. 2). As the light rays from the lamp pass through the condensing system, a transparent object or slide placed in the receptacle 12 will be illuminated, and the rays from this object will pass horizontally across the upper portion of chamber 14 and through the projecting lens 21 and in this way the image of the object is enlarged and projected in magnified form upon the screen. Opaque objects, however, cannot be illuminated in the manner above described, and according to my invention a high illumination of opaque objects is attained by placing the object within the area A—B in the lower portion of chamber 14, the surface of the object to be illuminated lying substantially at right angles to the plane of the screen. A projecting lens 21$^a$ is fitted in the opening 19 in the top of the chamber above the object, having a mirror or prism 22 adjacent thereto for diverting the rays from the vertical to a substantially horizontal direction in order that the image may be projected upon a screen arranged in a vertical plane. A cover 23 is fitted in the front opening 17 having a mirror 23ª thereon having its reflecting surface inclined and located at the focal point of the light rays projecting from the condensing system, the inclination of the mirror being capable of adjustment in a vertical plane as shown in order that the divergent rays therefrom will center on the object occupying the desired area of illumination A—B. With the apparatus arranged in this way, the rays from the lamp pass through the condensing system and converge toward the focal point F on the mirror 23ª, and from the mirror the rays diverge in a deflected course to the area of illumination A—B usually on the bottom of the chamber, producing a high illumination of an object occupying the said area. The rays emanating from the object will pass upwardly through the projecting lens 21ª and are then directed in the desired direction by the mirror 22, the latter being preferably adjustable as at 22ª to enable the image to be readily positioned on the screen. The best results have been obtained by the use of mirrors or reflecting surfaces for deflecting the rays at 22 and 23ª, but the invention comprehends the use broadly of various kinds of deflectors for diverting the rays, as prisms and other devices could be employed for this purpose.

Projecting apparatus constructed in accordance with my invention is capable of projecting images from either transparent or opaque objects, and a high illumination of the object is attained, particularly when operating with opaque objects. Moreover, the construction and arrangement of the parts is such that they may be conveniently handled and manipulated, and as the lamp, condensing system and the chamber embodying the optical elements of the apparatus are all mounted on the rigid bed, the optical center is always rigidly maintained.

I claim as my invention:

1. In a projection apparatus, the combination with a condensing system embodying a plurality of lens elements for projecting converging rays, of a reflector arranged to receive the converging rays and to deflect them as diverging rays to one side of the optical axis of the condensing system, and a projecting device arranged on the opposite side of the axis of the condensing system and receiving rays from an object on that side to which the rays are deflected by the reflector.

2. In a projection apparatus, the combination with a condensing system embodying a plurality of lens elements projecting converging rays, of a chamber receiving converging rays from said system, a reflector arranged in the chamber receiving the converging rays and directing them as diverging rays to one side of the chamber, said chamber being provided with an opening in the side opposite to that on which the rays are thrown by the reflector, and a deflector arranged without the chamber in proximity to said opening to receive the rays passed therethrough and deflect them.

3. In a projection apparatus, the combination with a chamber, of a condensing system arranged exteriorly of the chamber and projecting converging rays therein, a deflector arranged within the chamber, receiving the converging rays from the condensing system and deflecting them as diverging rays to one side of the chamber, a projecting device arranged at the opposite side of the chamber to receive the rays from an object at the side to which the rays are deflected by the reflector, and a deflector receiving rays from the projecting device and deflecting them in a direction at an angle to the optical axis of the device.

4. In projecting apparatus, the combination with an illuminating device, and a condenser therefor of a chamber arranged to receive the convergent rays from the illuminating device and having a horizontal support and adapted to receive the object to be illuminated, a deflector located at the focal point of the rays for deflecting the rays from the illuminating device and directing divergent rays upon the object, and a second deflector for directing the rays from the object upon a screen.

5. In projecting apparatus, the combination with a condensing system, of a chamber arranged to receive the rays from the condensing system, an adjustable reflector located at the focus of the said condensing system and reflecting convergent rays received by it from the condensing system, as divergent rays to an object to be illuminated and a projecting lens for projecting an image of the illuminated object.

6. In a projection apparatus, the combination with a condensing system, of a chamber arranged to receive rays from the condensing system, and having a horizontal support and an opening in its top above the support, a reflector located at the focus of the condensing system, adapted to reflect rays onto an object on the support, and a second reflector arranged above the opening to direct the rays from the object upon a screen.

WILLIAM L. PATTERSON.

Witnesses:
G. WILLARD RICH,
CLARENCE A. BATEMAN.